United States Patent
Lo Presti et al.

(10) Patent No.: US 11,292,295 B2
(45) Date of Patent: Apr. 5, 2022

(54) METHOD FOR CONTROLLING THE DISCHARGE OF FLUIDS DURING A PROCESS FOR VULCANIZATION AND MOLDING OF A GREEN TIRE AND TIRE FOR VEHICLE WHEELS

(71) Applicant: Pirelli Tyre S.p.A., Milan (IT)

(72) Inventors: Gaetano Lo Presti, Milan (IT); Gianni Mancini, Milan (IT); Albert Berenguer, Milan (IT); Alfredo Balini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 223 days.

(21) Appl. No.: 14/721,530

(22) Filed: May 26, 2015

(65) Prior Publication Data

US 2015/0336344 A1 Nov. 26, 2015

Related U.S. Application Data

(62) Division of application No. 13/376,626, filed as application No. PCT/IB2010/052416 on May 31, 2010, now Pat. No. 9,073,277.

(Continued)

(30) Foreign Application Priority Data

Jun. 9, 2009 (IT) .......................... MI2009A001009

(51) Int. Cl.
*B60C 5/00* (2006.01)
*B60C 5/14* (2006.01)
(Continued)

(52) U.S. Cl.
CPC .................. *B60C 5/00* (2013.01); *B60C 5/14* (2013.01); *B60C 13/02* (2013.01);
(Continued)

(58) Field of Classification Search
CPC ........ B29D 30/0654; B29D 2030/0612; B29D 2030/0616; B29D 2030/0658;
(Continued)

(56) References Cited

U.S. PATENT DOCUMENTS 1,827,668 A * 10/1931 Musselman ............. B60C 13/02
152/452
2,790,205 A 4/1957 Parker
(Continued)

FOREIGN PATENT DOCUMENTS

EP 2 014 484 A1 1/2009
EP 2 060 386 A1 5/2009
(Continued)

OTHER PUBLICATIONS

Machine generated English language translation of JP 2005-280259 (original document dated Oct. 2005).*
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A method for controlling the discharge of fluids during a process for vulcanization and moulding of a green tire includes the steps of: building at least one portion of a radially internal surface of a green tire by winding of a continuous elongated element of elastomeric material into a plurality of coils confining circumferential grooves along the rolling direction of the tire; disposing the circumferential grooves into fluid communication with discharge channels present in the radially external surface of a pressing bladder disposed in a radially internal cavity bounded by the green tire.

15 Claims, 8 Drawing Sheets

Related U.S. Application Data

(60) Provisional application No. 61/213,850, filed on Jul. 21, 2009.

(51) Int. Cl.
*B60C 13/02* (2006.01)
*B29D 30/06* (2006.01)
*B60C 13/00* (2006.01)

(52) U.S. Cl.
CPC ...... *B29D 30/0601* (2013.01); *B29D 30/0681* (2013.01); *B29D 2030/0655* (2013.01); *B29D 2030/0682* (2013.01); *B60C 2013/026* (2013.01); *Y10T 152/10495* (2015.01)

(58) Field of Classification Search
CPC ........ B29D 2030/0659; B29D 30/0601; B29D 30/0662; B29D 30/0681; B29D 2030/0655; B29D 2030/0675; B29D 2030/0682; B29D 2030/726; B29D 2030/728; B60C 5/00; B60C 9/02; B60C 9/0207; B60C 13/00; B60C 13/001; B60C 13/02; B60C 15/0009; B60C 2013/026; B60C 19/002; B60C 2009/0215; Y10T 152/10495
USPC .......................................... 156/110; 152/523
See application file for complete search history.

(56) References Cited

U.S. PATENT DOCUMENTS

| | | | | | |
|---|---|---|---|---|---|
| 3,143,155 | A | * | 8/1964 | Knox | B29C 33/10 152/450 |
| 3,782,440 | A | * | 1/1974 | Depmeyer | B60C 13/00 152/523 |
| 3,989,429 | A | * | 11/1976 | Mattson | B29D 30/0654 425/52 |
| 5,062,781 | A | | 11/1991 | Szyms et al. | |
| 5,316,064 | A | * | 5/1994 | Tani | B60C 9/2204 152/531 |
| 5,746,860 | A | * | 5/1998 | Moriyama | B29D 30/36 156/111 |
| 5,879,488 | A | | 3/1999 | Weston et al. | |
| 7,093,629 | B2 | * | 8/2006 | Tanaka | B29D 30/60 152/209.1 |
| 2003/0012284 | A1 | | 1/2003 | Kazayama et al. | |
| 2003/0102088 | A1 | * | 6/2003 | Iiduka | B29D 30/20 156/394.1 |
| 2006/0027309 | A1 | * | 2/2006 | Hayashi | B29D 30/3028 156/130 |
| 2006/0113019 | A1 | * | 6/2006 | Hasegawa | B60C 5/14 152/510 |
| 2007/0044884 | A1 | | 3/2007 | Nishitani | |
| 2007/0131326 | A1 | * | 6/2007 | Yukawa | B60C 19/002 152/450 |
| 2008/0142139 | A1 | * | 6/2008 | Kraus | B60C 15/06 152/458 |
| 2008/0190540 | A1 | | 8/2008 | Hashimura et al. | |
| 2009/0165914 | A1 | | 7/2009 | Tomoi | |
| 2010/0126647 | A1 | | 5/2010 | Hashimura et al. | |
| 2011/0000603 | A1 | | 1/2011 | Hashimura et al. | |

FOREIGN PATENT DOCUMENTS

| | | | | |
|---|---|---|---|---|
| EP | 2 060 410 A1 | | 5/2009 | |
| JP | 04-90902 | | 3/1992 | |
| JP | 2000-317940 | | 11/2000 | |
| JP | 2002-18973 | | 1/2002 | |
| JP | 2002-137227 | | 5/2002 | |
| JP | 2002-160508 | | 6/2002 | |
| JP | 2003-200448 | | 7/2003 | |
| JP | 2005066865 A | * | 3/2005 | ......... B29D 30/0654 |
| JP | 2005-280259 | * | 10/2005 | ............ B29C 33/02 |
| JP | 2006-35488 | | 2/2006 | |
| JP | 2007302072 A | * | 11/2007 | ........... B60C 19/002 |
| JP | 2008-012751 | | 1/2008 | |
| JP | 64-30809 | * | 11/2018 | ............. B60C 17/08 |
| WO | WO 2006/035263 | * | 4/2006 | ............. B29C 47/12 |
| WO | WO 2006/095680 | | 9/2006 | |
| WO | WO 2008-029779 | | 3/2008 | |
| WO | WO 2008/099236 A1 | | 8/2008 | |

OTHER PUBLICATIONS

English language Abstract for Application JP62187971 (original document dated Feb. 1989) (Year: 1989).*
Machine generated English language translation of JP 64-30809 (original document dated Feb. 1989) (Year: 1989).*
Katsumi Hirose, JP-2007302072-A, machine translation. (Year: 2007).*
Yougun Kii, JP-2005280259-A, updated machine translation. (Year: 2005).*
David King, Hall of Hexagons, p. 1, Oct. 25, 2005. (Year: 2005).*
Yasushi Ota, JP-2002137227-A, updated machine translation. (Year: 2002).*
Shin Sakuma, JP-2005066865-A, machine translation. (Year: 2005).*
Written Opinion of the International Searching Authority from the European Patent Office for International Application No. PCT/IB2010/052416, dated Aug. 20, 2010.
International Search Report from the European Patent Office for International Application No. PCT/IB2010/052416, dated Aug. 20, 2010.
Notification of the First Office Action dated Oct. 29, 2013 by the State Intellectual Property Office of the People's Republic of China in corresponding Application No. CN 201080025291.X (11 pages).
English-language translation of Notification of the First Office Action dated Oct. 29, 2013 by the State Intellectual Property Office of the People's Republic of China in corresponding Application No. CN 201080025291.X (16 pages).
CCPIT Patent and Trademark Office—Office Action for counterpart Chinese Application No. 201080025291.X, dated Jun. 5, 2014.
Notice of Reasons for Rejection issued by the Japanese Patent Office dated Jan. 31, 2014 in corresponding Application No. JP 2012-514564 (2 pages).
English-language translation of notice of Reasons for Rejection issued by the Japanese Patent Office dated Jan. 31, 2014 in corresponding Application No. JP 2012-514564 (2-pages).
CCPIT Patent and Trademark Office—Office Action for counterpart Chinese Application No. 201080025291.X, dated Sep. 4, 2014.
Office Action dated Aug. 30, 2019, from the Brazilian Patent and Trademark Office in counterpart Brazilian Application No. PI1011013-5.

* cited by examiner

FIG 6a
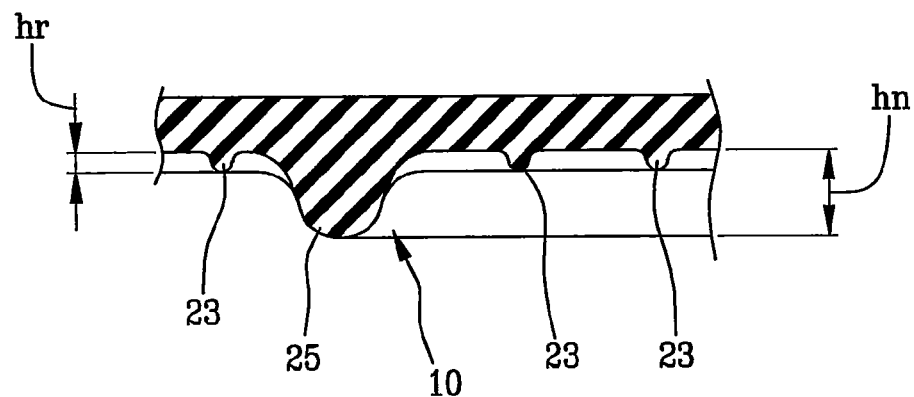
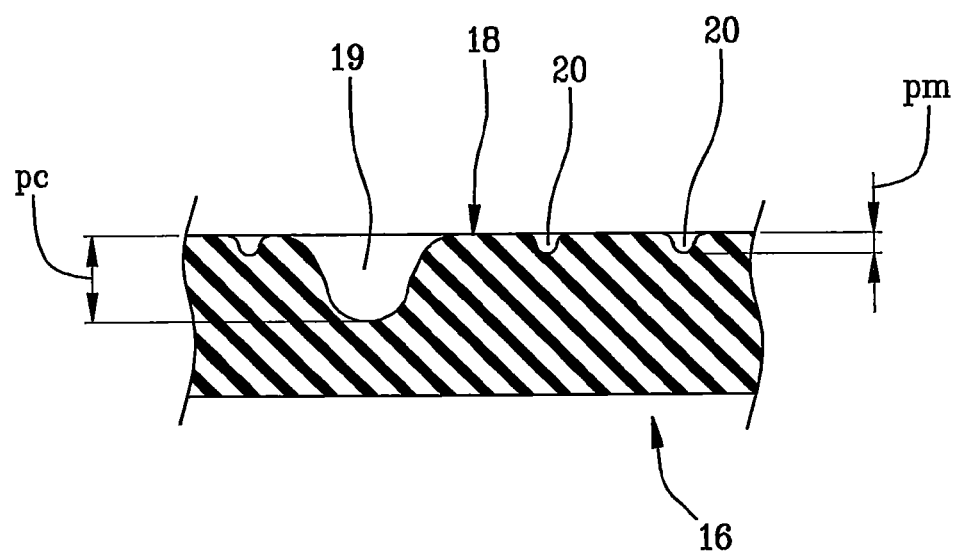
FIG 5a

METHOD FOR CONTROLLING THE DISCHARGE OF FLUIDS DURING A PROCESS FOR VULCANIZATION AND MOLDING OF A GREEN TIRE AND TIRE FOR VEHICLE WHEELS

CROSS REFERENCE TO RELATED APPLICATIONS

This application is a divisional of U.S. application Ser. No. 13/376,626, filed Dec. 7, 2011, which is a national phase application based on PCT/IB2010/052416, filed May 31, 2010, which claims the priority of Italian Patent Application No. MI2009A001009, filed Jun. 9, 2009, and claims the benefit of U.S. Provisional Application No. 61/213,850, filed Jul. 21, 2009, the content of each of the applications being incorporated herein by reference.

BACKGROUND OF THE INVENTION

Field of the Invention

The present invention relates to a method for controlling the discharge of fluids during a process for vulcanization and molding of a green tire and to a tire for vehicle wheels.

Description of the Related Art

A tire for vehicle wheels generally comprises a carcass structure including at least one carcass ply having respectively opposite end flaps in engagement with respective annular anchoring structures, integrated into the regions usually identified as "beads", the inner diameter of which substantially corresponds to the so-called "fitting diameter" of the tire on a respective mounting rim.

Associated with the carcass structure is a belt structure comprising one or more belt layers disposed in radially superposed relationship with each other and with the carcass ply and provided with textile or metallic reinforcing cords having a crossed orientation and/or being substantially parallel to the circumferential extension direction of the tire. A tread band is applied at a radially external position to the belt structure, which tread band too is made of elastomeric material like other semifinished products constituting the tire. Respective sidewalls of elastomeric material are also applied at an axially external position to the side surfaces of the carcass structure, each extending from one of the side edges of the tread band until close to the respective annular anchoring structure to the beads. In tires of the "tubeless type", an airtight coating layer, usually referred to as "liner", covers the inner surfaces of the tire.

After building of the green tire carried out by assembly of respective components, a vulcanization and molding treatment is generally accomplished aiming at determining the structural stabilization of the tire by cross-linking of the elastomeric compounds and at impressing the tire with the desired tread pattern as well as with possible distinctive graphic marks at the tire sidewalls.

Herein and in the following of the present specification, by low-section tire it is intended a tire having a reduced section ratio, i.e. in which the section height measured between the radially outermost point of the tread band and the radially innermost point of the bead is less than about 50% of the section width axially measured at the maximum-chord point of the tire. More specifically, in the present context low-section tires are considered in which the section height is included between about 20% and about 50% of the section width, preferably between about 30% and about 45% of the section width.

Document WO 2008/099236, in the name of the same Applicant, discloses a process in which the carcass ply is applied around an outer surface of a building drum. Application of first components of the carcass sleeve takes place at the building drum by means of auxiliary devices. These auxiliary devices comprise one or more dispensers supplying at least one continuous elongated element of elastomeric material while the building drum is being driven in rotation about its geometric axis so as to form the liner on the outer surface and the bearing surfaces. An annular anchoring structure defining the fitting diameter is coaxially engaged around each of the end flaps. An outer sleeve comprising at least one belt structure possibly associated with a tread band is disposed at a coaxially centered position around the carcass sleeve applied onto the building drum. Through axial approaching of two halves forming the building drum, the carcass sleeve is shaped into a toroidal configuration to cause application thereof against a radially internal surface of the outer sleeve.

Document US 2003/012284 discloses a pressing bladder for pressing an inner surface of a tire through use of a pressurized heating means during vulcanization of a green tire. The pressing bladder comprises a textile layer and rubber layers disposed upon each other. The pressing bladder is positioned inside the green tire enclosed in a mold. A high-temperature and high-pressure fluid is fed into the pressing bladder, causing expansion of same so that the tire is pushed against the inner wall of the mold. In this way, the outer face of the green tire is impressed with a tread pattern and the green tire is vulcanized by a heating action carried out by the heating fluid and the mold. If the textile layer consists of a knitted fabric and faces the tire, the residual gas interposed between the pressing bladder and the green tire spreads over the unevenness of the outer fabric surface and comes out of the tire end portions without forming big bubbles. If the knitted-fabric layer is at the inside and the rubber layer faces the tire, during pressing the uneven features of the fabric layer are transferred to the rubber layer on the mold side thus forming depressions and elevations. The residual gas spreads through the depressions and comes out of the end portions of the tire.

SUMMARY OF THE INVENTION

According to the present invention, the Applicant has dealt with the problem of improving discharge of the fluids (air and/or steam, for example) remaining between the radially internal surface of the green tire and the radially external surface of the pressing bladder, in order to obtain a perfect and even adhesion between the two surfaces and optimization of the vulcanization and molding process.

In particular, the Applicant has noticed that during inflation of the pressing bladder, the radially internal surface of the green tire has such a shape that the outer surface of said pressing bladder adheres first against a crown portion of said radially internal surface close to an equatorial plane of the green tire, and to portions close to the beads. Only at a second time the pressing bladder adheres against the radially internal portions placed at the boundary between tread band and rid ails of the green tire, which portions have a greater curvature. The Applicant has noticed that there is a tendency of the fluids to store in said regions having a greater curvature.

This phenomenon is of great importance in tires of the low-section type which have small radii of curvature between the sidewall and tread.

The Applicant has perceived that the fluid discharge speed and efficiency can be increased if the fluids that are concentrated in specific regions are distributed along at least part of the circumferential extension of the green tire so that they can find a way out to the external environment along a plurality of evacuation paths distributed on said circumferential extension.

The Applicant has then envisaged the possibility of building the green tire to be cured in such a manner that it is possible to utilize the geometric features of the green tire itself for conveying the fluids along circumferential paths extending in the rolling direction of the tire, so as to also enable exploitation of the geometric features of said pressing bladder.

The Applicant has finally found that if at least one radially internal portion of the green tire is built using a continuous elongated element of elastomeric material wound up into a plurality of coils confining circumferential grooves along the rolling direction of the tire, and bringing said circumferential grooves into fluid communication with discharge channels provided in said pressing bladder, it is possible to convey the fluids interposed between green tire and pressing bladder towards the environment external to the mold.

More specifically, in a first aspect the present invention relates to a method for controlling the discharge of fluids during a process for vulcanization and molding of a green tire, said fluids being interposed between the radially external surface of a pressing bladder and the radially internal surface of the green tire, said method comprising the steps of:

building at least one portion of said radially internal surface by winding of a continuous elongated element of elastomeric material into a plurality of coils confining circumferential grooves along the rolling direction of the tire;

disposing said circumferential grooves into fluid communication with discharge channels present in said radially external surface.

It is the Applicant's opinion that manufacturing said grooves in the radially internal surface of the green tire enables an efficient fluid discharge to be obtained without the mold and/or bladder structure being modified, so that the mold costs and the tire production costs can be controlled.

In accordance with a second aspect, the present invention relates to a green tire, comprising:

i) a continuous elongated element of elastomeric material wound up into a plurality of coils in such a manner as to define at least one portion of radially internal surface of the green tire, said coils confining respective circumferential grooves between them in the rolling direction of the tire.

The circumferential grooves of the green tire enable an efficient fluid discharge to be obtained during the vulcanization and molding step of said tire carried out using the pressing bladder.

In accordance with a third aspect, the present invention relates to a cured and molded tire, comprising:

i) a radially internal surface that is provided, at least on a portion thereof, with circumferential alignment lines in the rolling direction of the tire at least in the region of a continuous elongated element of elastomeric material wound up into a plurality of coils during building of the tire.

The circumferential lines are originated from circumferential grooves of the green tire following compression and vulcanization of same. In fact, the pressure exerted by the pressing bladder squashes the elongated element wound into coils. The circumferential lines are marks remaining at the coupling regions between adjacent coils. Each of the circumferential lines substantially lies in a plane parallel to an equatorial plane of the cured and molded tire and always remains at the same radial distance from the rotation axis of the tire itself. These circumferential lines prove that the finished tire has been built, cured and molded in a manner adapted to avoid the occurrence of problems connected with an inefficient fluid discharge or lack of discharge.

In a fourth aspect the present invention relates to a process for manufacturing tires, comprising the steps of
i) building a green tire,
said green tire comprising a carcass structure having at least one carcass ply the ends of which are turned up around two respective annular anchoring structures that are mutually spaced apart along an axial direction of the tire,
by at least the step of winding no a continuous elongated element of elastomeric material on a forming support so as to form a plurality of coils, in such a manner as to define at least one portion of radially internal surface of the green tire, in which the aforesaid coils confine respective circumferential grooves between them, along the rolling direction of the tire;
ii) disposing the green tire in a vulcanization mold and introducing a pressing bladder into a radially internal cavity bounded by said green tire, said pressing bladder being provided, in the inflated configuration, with discharge channels formed in a radially external surface thereof, which channels are in fluid communication with the external environment;
iii) molding the green tire by inflating the pressing bladder and making the radially external surface of said pressing bladder adhere to a radially internal surface of the green tire;
iv) supplying heat to the green tire for curing it;
wherein, during the step iii), the circumferential grooves are in fluid communication with the discharge channels, for guiding the fluids interposed between the radially external surface of the pressing bladder and the radially internal surface of the green tire to said discharge channels.

The present invention, in at least one of the above aspects, can have one or more of the preferred features hereinafter described.

Preferably, the discharge channels comprise a plurality of micro-channels disposed in a reticular structure defining a plurality of cells.

Preferably, the discharge channels comprise a plurality of main channels, each of them extending from a radially internal portion of the radially external surface of the pressing bladder in an inflated configuration, to an equatorial portion of said pressing bladder.

Preferably, the micro-channels are in fluid communication with the main channels.

Preferably, at least some of the micro-channels intersect at least some of the main channels.

The micro-channels guide the fluids to the main channels and the external environment through a plurality of evacuation paths distributed on the pressing bladder.

Due to the distribution in a reticular form, all points of the radially external surface of the pressing bladder can be reached and it is possible to discharge pockets of fluid disposed everywhere in the volume interposed between the pressing bladder and the green tire.

Preferably, the reticular structure of the micro-channels is made up of contiguous polygons.

Preferably, the polygons have obtuse angles.

The micro-channels linked up by obtuse angles offer a low resistance to the flowing fluids, which is advantageous for the discharge efficiency.

Preferably, each of the cells encloses an area greater than about 0.5 mm$^2$.

Preferably, each of the cells encloses an area smaller than about 500 mm².

More preferably, each of the cells encloses an area greater than about 1 mm².

More preferably, each of the cells encloses an area smaller than about 200 mm².

More preferably, each of the cells encloses an area greater than about 5 mm².

More preferably, each of the cells encloses an area smaller than about 100 mm².

Preferably, the micro-channels have a width greater than about 0.15 mm.

Preferably, the micro-channels have a width smaller than about 2 mm.

More preferably, the micro-channels have a width greater than about 0.25 mm.

More preferably, the micro-channels have a width smaller than about 1 mm.

Preferably, the micro-channels have a depth greater than about 0.1 mm.

Preferably, the micro-channels have a depth smaller than about 1.5 mm.

More preferably, the micro-channels have a depth greater than about 0.2 mm.

Preferably, the micro-channels have a depth smaller than about 0.8 mm.

Preferably, the main channels have a width greater than about 0.3 mm.

Preferably, the main channels have a width smaller than about 4 mm.

More preferably, the main channels have a width greater than about 0.5 mm.

More preferably, the main channels have a width smaller than about 3 mm.

Preferably, the main channels have a depth greater than about 0.5 mm.

Preferably, the main channels have a depth smaller than about 3 mm.

More preferably, the main channels have a depth greater than about 0.7 mm.

More preferably, the main channels have a depth smaller than about 2 mm.

The density of the micro-channels in the surface of the pressing bladder, the sizes thereof and of the main channels are selected based on specific requirements.

In a preferred embodiment, referred to as "L" the half-width in the axial direction of a belt structure associated at a radially external position with a carcass structure of said green tire and referred to as "H" the height of the cross-section of the green tire, when the pressing bladder adheres to the radially-internal surface of the green tire, the reticular structure in the cross-section of the green tire extends at least along the radially internal surface of said tire from about 90% of "L", starting from an equatorial plane of the green tire, to about 20% of "H", starting from a radially internal end of the green tire.

In a preferred alternative embodiment, when the pressing bladder adheres to the radially internal surface of the green tire, the reticular structure extends at least from one axially external end of a belt structure associated at a radially external position with a carcass structure, to a region of maximum axial bulkiness of a sidewall of the section of the green tire.

This extension region corresponds to the radially internal surface of the green tire having the greatest curvature, where the fluids tend to store during inflation of the pressing bladder.

In a further preferred alternative embodiment, when the pressing bladder adheres to the radially internal surface of the green tire, the reticular structure substantially extends over the whole radially internal surface of the green tire.

Preferably, the circumferential grooves have a width greater than about 0.05 mm.

Preferably, the circumferential grooves have a width smaller than about 2 mm.

More preferably, the circumferential grooves have a width greater than about 0.1 mm.

More preferably, the circumferential grooves have a width smaller than about 1.5 mm.

Preferably, the circumferential grooves have a depth greater than about 0.05 mm.

Preferably, the circumferential grooves have a depth smaller than about 1 mm.

More preferably, the circumferential grooves have a depth greater than about 0.1 mm.

More preferably, the circumferential grooves have a depth smaller than about 0.3 mm.

The groove sizes depend on the features of the elongated element (shape and sizes of the cross-section thereof) and the laying mode (elongated element laid in the form of coils disposed in side by side relationship or partly overlapping each other to a greater or smaller degree) and are selected based on specific requirements.

In a preferred embodiment of the method, referred to as "L" the half-width in the axial direction of a belt structure associated at a radially external position with a carcass structure of the green tire and referred to as "H" the section height of the green tire, said circumferential grooves extend in the cross-section of the green tire at least from about 90% of "L", starting from an equatorial plane of the green tire, to about 20% of "H", starting from a radially internal end of the green tire.

In a preferred alternative embodiment of the method, said circumferential grooves extend at least from one axially external end of a belt structure associated at a radially external position with a carcass structure, to a region of maximum axial bulkiness of a sidewall of the section of the green tire.

In a further preferred alternative embodiment of the method, said circumferential grooves substantially extend over the whole radially internal surface of the green tire.

Preferably, step i) of the process comprises the steps of:
i') applying at least one carcass ply around the continuous elongated element of elastomeric material wound up into a plurality of coils, said at least one carcass ply having axially opposite end flaps;
i'') coaxially engaging an annular anchoring structure around each of the end flaps;
i''') turning up each end flap around the corresponding annular anchoring structure so as to make a carcass sleeve;
i'''') positioning an outer sleeve comprising at least one belt structure to a coaxially centered position around said carcass sleeve;
i''''') shaping said carcass sleeve into a toroidal configuration for causing application of same against a radially internal surface of said outer sleeve.

In a preferred embodiment said green tire comprises:
ii) a carcass structure having at least one carcass ply the ends of which are turned up around two respective annular anchoring structures mutually spaced apart along an axial direction of the green tire.

Preferably, the circumferential grooves have a width greater than about 0.05 mm.

Preferably, the circumferential grooves have a width smaller than about 2 mm.

More preferably, the circumferential grooves have a width greater than about 0.1 mm.

More preferably, the circumferential grooves have a width smaller than about 1.5 mm.

Preferably, the circumferential grooves have a depth greater than about 0.05 mm.

Preferably, the circumferential grooves have a depth smaller than about 1 mm.

More preferably, the circumferential grooves have a depth greater than about 0.1 mm.

More preferably, the circumferential grooves have a depth smaller than about 0.3 mm.

In a preferred embodiment of the green tire, referred to as "L" the half-width in the axial direction of a belt structure associated at a radially external position with said carcass structure and referred to as "H" the section height of the green tire, said circumferential grooves extend in the cross-section of the green tire at least from about 90% of starting from an equatorial plane of the green tire, to about 20% of "H", starting from a radially internal end of the green tire.

In a preferred alternative embodiment of the green tire, said circumferential grooves extend at least from one axially external end of a belt structure associated at a radially external position with said carcass structure, to a region of maximum axial bulkiness of a sidewall of the section of the green tire.

In a further preferred alternative embodiment of the green tire, said circumferential grooves substantially extend over the whole radially internal surface of the green tire.

According to a preferred embodiment of the cured and molded tire, said cured and molded tire comprises:

ii) a carcass structure having at least one carcass ply having its ends turned up around two respective annular anchoring structures mutually spaced apart along an axial direction of the cured and molded tire.

According to a further preferred embodiment of the cured and molded tire, said radially internal surface has a plurality of ridges disposed according to a reticular structure defining a plurality of cells.

Preferably, said radially internal surface has a plurality of ribs each extending from a radially internal portion to an axially centered portion of said radially internal surface.

The ridges and ribs on the cured and molded tire respectively correspond the micro-channels and main channels present in the radially external surface of the pressing bladder described above with reference to the method according to the present invention. In fact, during pressing of the pressing bladder against the green tire, the elastomeric material belonging to the radially internal surface portion of said green tire and located at the micro-channels and main channels of the pressing bladder, penetrates into the same where it polymerizes taking a steady shape matching the shape of said micro-channels and main channels.

Preferably, at least some of said ridges are in contact with at least some of said ribs.

In addition, preferably, at least some of said ridges intersect at least some of said ribs.

Preferably, said reticular structure of ridges is made up of contiguous polygons.

Preferably, said polygons have obtuse angles.

Preferably, each of the cells encloses an area greater than about 0.5 mm$^2$.

Preferably, each of the cells encloses an area smaller than about 500 mm$^2$.

Preferably, each of the cells encloses an area greater than about 1 mm$^2$.

Preferably, each of the cells encloses en area smaller than about 200 mm$^2$.

Preferably, each of the cells encloses an area greater than about 5 mm$^2$.

Preferably, each or the cells encloses an area smaller than about 100 mm$^2$.

Preferably, said ridges have a width greater than about 0.15 mm.

Preferably, said ridges have a width smaller than about 2 mm.

Preferably, said ridges have a width greater than about 0.25 mm.

Preferably, said ridges have a width smaller than about 1 mm.

Preferably, said ridges have a height greater than about 0.1 mm.

Preferably, said ridges have a height smaller than about 1.5 mm.

Preferably, said ridges have a height greater than about 0.2 mm.

Preferably, said ridges have a height smaller than about 0.8 mm.

Preferably said ribs have a width greater than about 0.3 mm.

Preferably said ribs have a width smaller than about 4 mm.

Preferably said ribs have a width greater than about 0.5 mm.

Preferably said ribs have a width smaller than about 3 mm.

Preferably said ribs have a height greater than about 0.5 mm.

Preferably said ribs have a height smaller than about 3 mm.

Preferably said ribs have a height greater than about 0.7 mm.

Preferably said ribs have a height smaller than about 2 mm.

In a preferred embodiment of the cured and molded tire, referred to as "L" the half-width in the axial direction of a belt structure associated at a radially-external position with said carcass structure and referred to as "H" the height of the cross-section of the cured and molded tire, said reticular structure in the cross-section of the cured and molded tire extends at least along the radially internal surface of same, from about 90% of "L" starting from an equatorial plane of the cured and molded tire to about 20% of "H", starting from a radially internal end of the cured and molded tire.

In a preferred alternative embodiment of the cured and molded tire, said reticular structure extends at least from an axially external end of a belt structure associated at a radially external position with said carcass structure, to a region or maximum axial bulkiness of the sidewall of the section of the cured and molded tire.

In a further preferred alternative embodiment of the cured and molded tire, said reticular structure substantially extends over the whole radially internal surface of the cured and molded tire.

In a further preferred alternative embodiment of the cured and molded tire, referred to as "L" the half-width in the axial direction of a belt structure associated at a radially external position with said carcass structure and referred to as "H" the section height of the cured and molded tire, said circumferential alignment lines extend in the cross-section of the cured and molded tire at least from about 90% of "L", starting from an equatorial plane of the cured and molded tire to about 20% of "H", starting from a radially internal end of the cured and molded tire.

In a further preferred alternative embodiment of she cured and molded tire, said circumferential alignment lines extend at least from one axially external end of a belt structure associated at a radially external position with said carcass structure, to a region of maximum axial bulkiness of the sidewall of the section of the cured and molded tire.

In a further preferred alternative embodiment of the cured and molded tire, said circumferential alignment lines substantially extend over the whole radially internal surface of the cured and molded tire.

Preferably, said cured and molded tire is of the low section type.

Further features and advantages will become more apparent from the detailed description of a preferred but not exclusive embodiment of a method for controlling the discharge of fluids during an operation for vulcanization and molding of a green tire, and of a tire for vehicle wheel in accordance with the present invention.

BRIEF DESCRIPTION OF THE DRAWINGS

This description will be set out hereinafter with reference to the accompanying drawings, given by way of non-limiting example, in which:

FIG. 5a is a section of a portion of the pressing bladder along line V-V in FIG. 5;

FIG. 6a is a section of the portion of the cured and molded tire along line VI-VI in FIG. 6;

DETAILED DESCRIPTION OF THE INVENTION

Figure 1:
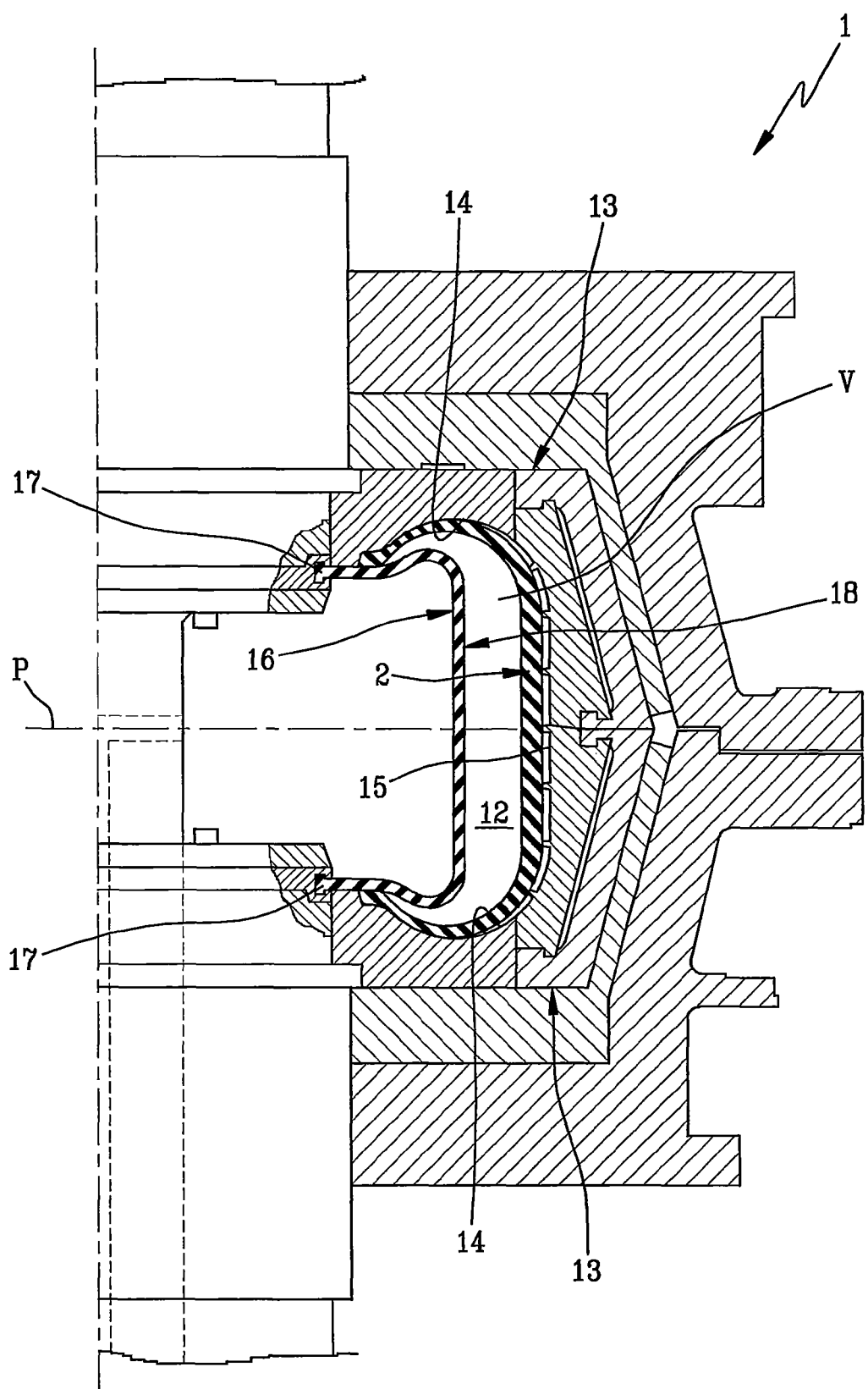
FIGS. 1, 2 and 3 diagrammatically show one half in diametrical section of a vulcanization mold during vulcanization and molding operating steps in succession belonging to a method according to the present invention.

With reference to the figures illustrated above and in particular to FIG. 8, it is herein pointed out that all reference numerals relating to the different tire portions (radially internal layer, carcass ply, belt structure, sidewalls, tread band, etc.) are the same whether they refer to the green tire or to the cured and molded tire. The cured and molded tire shows the grooves of the tread pattern in chain line in FIG. 8.

Figure 2:
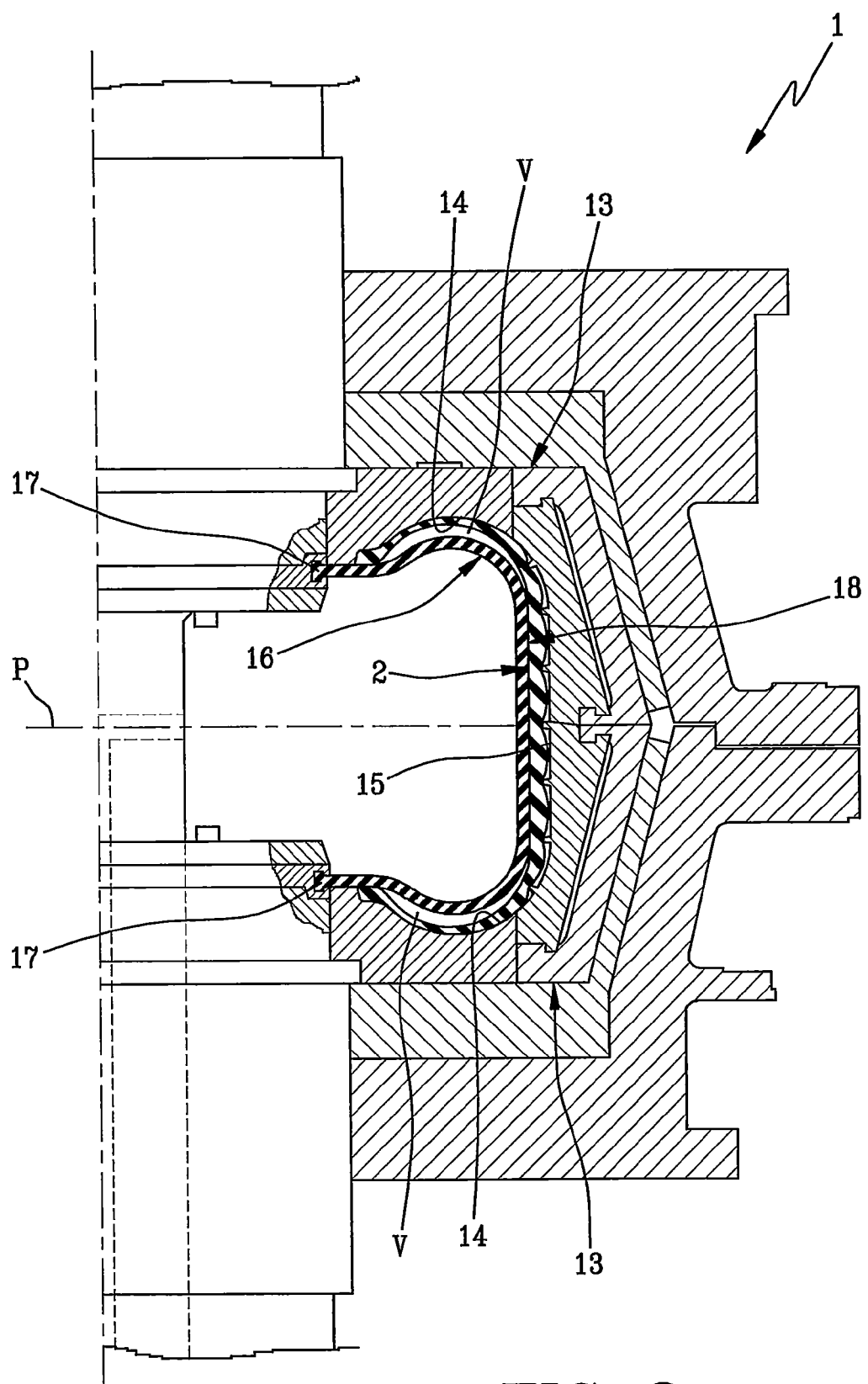
Figure 3:
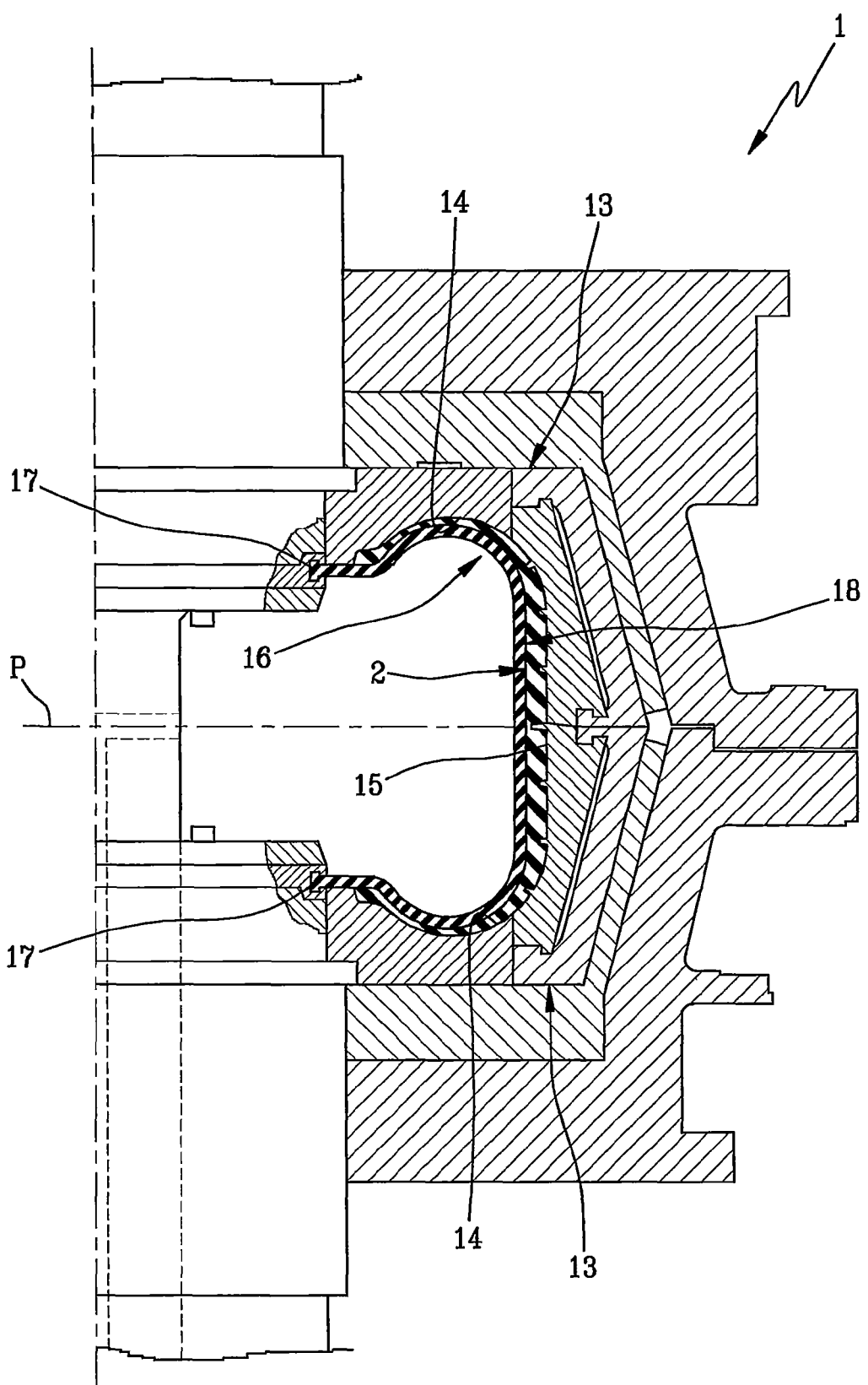

With reference to FIGS. 1, 2 and 3, generally denoted at 1 is a vulcanization mold belonging to a plant for manufacturing tires. Enclosed in mold 1 is a green tire 2 which has to be cured and molded for obtaining a cured and molded tire 2'.

To the aims of the present invention, use of the method of the invention is in addition preferred for producing high and ultra-high performance low-section tires.

The plant comprises a building station designed to manufacture green tires 2 essentially comprising (FIG. 8) at least one carcass ply 3 preferably internally coated with an impervious layer of elastomeric material, a so-called "liner" 4. Two annular anchoring structures 5, each comprising a so-called bead core 5a carrying an elastomeric filler 5b at a radially external position, are in engagement with respective end flaps 3a of the carcass ply or plies 3. The annular anchoring structures 5 are integrated in the vicinity of regions usually identified as "beads", at which engagement between the cured and molded tire 2' and the respective mounting rim (not shown) usually takes place according to a fitting diameter determined by the inner diametrical sizes of the annular anchoring structures 5.

A belt structure 6 is circumferentially applied around the carcass ply/plies 3, and a tread band 7 is circumferentially superposed on the belt structure 6. Two sidewalls 8, each extending from the corresponding bead and a corresponding side edge of the tread band 7 are applied at laterally opposite positions to the carcass ply/plies 3.

In the aforesaid building station a so-called carcass sleeve comprising the carcass ply/plies 3 coupled to the respective annular anchoring structures 5 is manufactured, as described in document WO 2008/099236 in the name of the same Applicant for example, on a substantially cylindrical outer surface of a forming support, not shown.

Figure 8A:
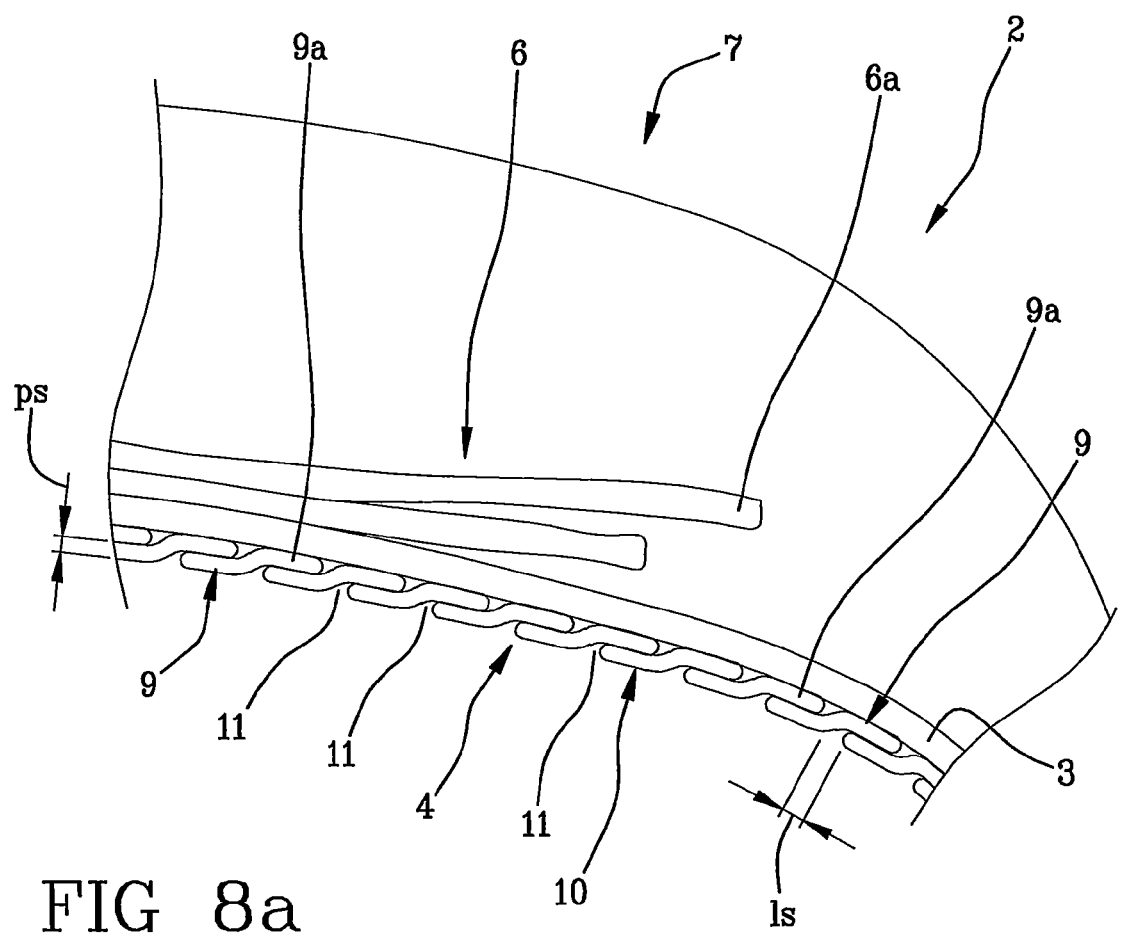
FIG. 8a is an enlarged portion of the green tire seen in FIG. 8.

Devices, not shown, carry out application of first components of the carcass sleeve at the forming support. In more detail, these devices comprise one or more dispensers feeding at least one continuous elongated element of elastomeric material 9, while the forming support is being driven in rotation around Its geometric axis, so as to form the aforesaid liner 4 on the outer surface of the forming support. In addition, or as an alternative to liner 4, said devices can be designed to form either abrasion-proof inserts on the outer surface, which inserts are to be incorporated at the beads, and/or auxiliary support inserts of elastomeric material (the so-called sidewall inserts) in case of tires of the self-supporting type (the so-called run-flat tires), so as to be then incorporated into the green tire 2 in the region of the sidewalls 8. Therefore said continuous elongated element of elastomeric material 9 forms at least one portion of radially internal surface 10 of the green tire 2 (FIG. 8a).

After formation of the above mentioned first components, devices not shown as they can be made in any convenient manner, apply the carcass ply/plies 3 to liner 4 and/or the above mentioned inserts, around the outer surface.

Each carcass ply 3 can consist of an article of manufacture in the form of a continuous strip previously cut according to the circumferential extension of the outer surface and fed to the latter, while the forming support is rotating around its geometric axis, so as to cause winding of said strip around said outer surface.

In a preferred embodiment, the application devices comprise members for sequentially applying a plurality of strip-like elements disposed transversely of the circumferential extension of the outer surface, while the forming support is being driven in rotation following a stepping course, in the same manner as described in document U.S. Pat. No. 6,328,084 in the name of the same Applicant, for example. It is to be pointed out, to the aims of the present specification, that by "strip-like element" it is intended an elementary component of elongated conformation comprising one or more reinforcing cords coupled to an elastomeric matrix, the length of which subtends the width of the carcass ply/plies 3 and having a width corresponding to a fraction of the circumferential extension of the carcass ply/plies.

The carcass ply/plies 3 are thus directly formed on the forming support, by means of the strip-like elements applied in mutually approached relationship so as to cover the whole circumferential extension of the outer surface.

When formation of the carcass ply/plies 3 has been completed, the end flaps 3a of the carcass ply/plies 3 are folded down towards the geometric axis of the forming support or drum, for example with the aid of rollers or other devices not shown as they can be made in any convenient manner.

Locating members not shown as they can be made in known manner, carry out fitting of each of the annular anchoring structures 5 coaxially around one of the end flaps 3a of the carcass ply/plies 3 folded down towards the geometric axis.

Consequently, the annular anchoring structures 5 fitted on the end flaps 3a are adapted to be located in axial abutment relationship, each against the corresponding half of the forming support.

When location has been completed, turning-up members carry out turning up of each of the end flaps 3a around the respective annular anchoring structure, so as to stabilize engagement of same with the carcass ply 3 causing formation of the aforesaid carcass sleeve.

After engagement of the annular anchoring structures 5, application of the sidewalls 8 can take place.

The forming support carrying the carcass sleeve is then transferred from the building station to a shaping station for receiving in engagement an outer sleeve integrating the belt structure 6, preferably already coupled to the tread band 7.

The outer sleeve can be prepared in advance by formation or winding of one or more belt layers adapted to form the belt structure 6 on an auxiliary drum (not shown) and subsequent winding of the tread band 7 on the belt structure 6 carried by the auxiliary drum. More particularly building of the tread band 7 can be carried out by dispensing members supplying a continuous elongated element of elastomeric material that is applied in the form of coils disposed in side by side and radially superposed relationship on the belt structure 6 carried by the auxiliary drum, while the latter is being driven in rotation.

The outer sleeve thus formed is adapted to be removed from the auxiliary drum, by means of a transfer ring or other suitable devices that will carry out transfer of same to the shaping station so as to dispose it at a coaxially centered position around the carcass sleeve carried by the building drum.

Shaping devices acting on the forming support operate in the shaping station for shaping the carcass sleeve into a toroidal configuration, so as to determine application of same against a radially internal surface of the outer sleeve.

When building has been completed, the green tire 2 can be removed from the forming support after radial contraction of said support, for submitting it to a vulcanization and molding step aiming at determining structural stabilization of the tire by cross-linking of the elastomeric compounds as well as at impressing the tread band with a desired tread pattern.

It is again stated that the green tire 2 has at least one radially internal surface portion 10 formed with the continuous elongated element of elastomeric material 9 wound up into coils 9a. Coils 9a are disposed in side by side relationship and/or partly superposed and each of them substantially lies in a circumferential path the center of which is in the rotation axis of the green tire 2. As better shown in FIG. 8a, the diametrical-section shape of coils 9a and the coil mutual arrangement are of such a nature that between two adjacent coils 9a a circumferential groove 11 is delimited which extends without a break along the rolling direction of the tire. The radially internal surface 10 of the green tire 2 therefore has a plurality of continuous and parallel circumferential grooves 11.

Figure 8:
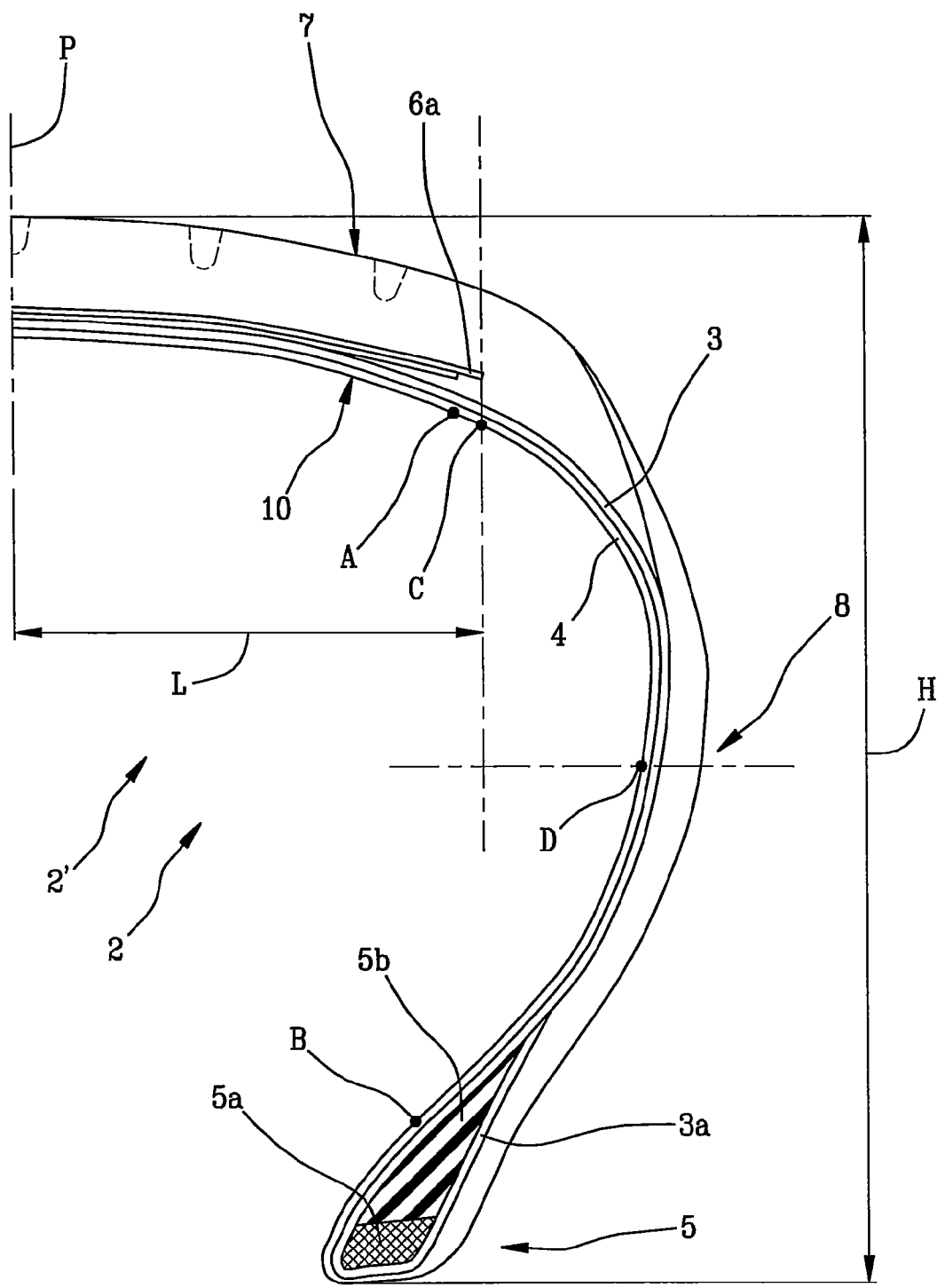
FIG. 8 is a partly diagrammatic diametrical section of a green/cured and molded tire in accordance with the present invention.

In the diametrical cross section of the green tire 2 shown in FIG. 8, said circumferential grooves 11 extend over the whole radially internal surface 10 defined by liner 4. Referred to as the half-width of the belt structure 6 associated at a radially external position with the carcass structure 3, measured orthogonally to the equatorial plane "P", and referred to as "H" the height of the section of the green tire 2, measured along a radial direction, in an alternative embodiment of the green tire 2, the circumferential grooves 11 extend at least from about 90% of "L" (point A in FIG. 8), starting from the equatorial plane "P" of the green tire 2, to about 20% of "H" (point B in FIG. 8), starting from a radially internal end of the green tire 2.

In a further alternative embodiment of the green tire 2, the circumferential grooves 11 extend from a region of the radially internal surface 10 corresponding to an axially external end 6a of the belt structure 6 (point C in FIG. 8) to a region of the radially internal surface 10 placed on the sidewall 8 and corresponding to the maximum axial bulkiness of the sidewall 8 of the section of the green tire 2 (point D in FIG. 8).

Preferably, the above described circumferential grooves 11 have a width "$l_s$" included between about 0.05 mm and about 2 mm, more preferably included between about 0.1 mm and about 1.5 mm. This width "$l_s$" is measured in a diametrical section and along a line tangent to the radially internal surface 10 of the green tire. This width "$l_s$" is the maximum width of the circumferential groove 11.

In addition, the circumferential grooves 11 have a depth "$p_s$" included between about 0.05 mm and about 1 mm, more preferably included between about 0.1 mm and about 0.3 mm. The depth "$p_s$" is measured along a straight line orthogonal to the above mentioned tangent line and is the maximum depth of the circumferential groove 11.

The vulcanization and molding treatment is carried out by introducing the green tire 2 into a molding cavity 12 of the vulcanization mold 1 (FIG. 1), which cavity 12 has a conformation corresponding to the outer conformation to be given to the cured and molded tire 2'.

The green tire 2, once enclosed in mold 1, is pressed against the containment walls. Subsequently or simultaneously with the pressing step, heat is supplied to the green tire 2 pressed against the containment walls.

By effect of pressing, suitable ridges provided on the mold sectors and plates respectively cause formation of a desired tread pattern on the tread band of the cured and molded tire 2', as well as or a plurality of graphic marks on the tire sidewalls. The supplied heat causes cross-linking of the elastomeric material of which the tire is made up.

As shown in FIGS. 2 and 3, mold 1 has a pair of axially opposite shells 13 that can be mutually coupled at an equatorial plane "P". Each of the shells 13 comprises a work surface 14 designed to act on the bead and sidewalls 8 of the green tire 2 to be cured.

The shells 13 mutually approached on said equatorial plane "P" further define a circumferential surface 15 designed to act against the tread band 7 of the green tire 2 to be cured.

The green tire 2, once enclosed in mold 1, is pressed against the containment walls by a suitable device 16 defined by a pressing bladder or expandable air bag.

The pressing bladder 16 of substantially toroidal conformation, has two radially internal circumferential edges carrying respective anchoring tailpieces 17, to be sealingly engaged in mold 1 for operatively associating the pressing bladder with mold 1. The anchoring tailpieces 17 are connected to mold 1 at the radially innermost anchoring regions of the surfaces of shells 13 receiving the beads of the green tire 2, and the pressing bladder 16 remains inserted in the radially internal cavity delimited by the green tire 2.

A duct for feeding steam or other working fluid, formed in mold 1, opens into the pressing bladder 16 so as to enable expansion of said bladder following introduction of steam under pressure, to compress the green tire 2 against the containment walls of mold 1.

The pressing bladder 16 on a radially external surface thereof 18 facing the green tire 2 is provided with a plurality of discharge channels forming a surface grooving.

The discharge channels comprise a plurality of main channels 19 which have a width "$l_c$" (FIG. 5) included between about 0.3 mm and about 4 mm, preferably included between about 0.5 mm and about 3 mm, and a depth "$p_c$" (FIG. 5a) included between about 0.5 mm and about 3 mm, preferably included between about 0.7 mm and about 2 mm. Width "$l_c$" is measured in a section transverse to the longitudinal extension of the respective main channel 19 and along a line tangent to the radially external surface 18 of the inflated pressing bladder 16. Depth "$p_c$" is measured along a straight line orthogonal to a plane tangent to the radially external surface 18 of the inflated pressing bladder 16.

Each of the main channels 19 extends from a radially internal portion (close to the anchoring tailpieces 17) of the radially external surface 18 of the pressing bladder 16, in an inflated configuration, to an equatorial portion of the pressing bladder 16 itself. The main channels 19 can either lie in diametrical planes or be inclined to said diametrical planes. Preferably, the main channels 19 have final ends 19a spaced apart from the equatorial plane "Pm" of the pressing bladder 16.

The main channels 19 allow the fluids entrapped in volume "V" confined between the radially external surface 18 of the pressing bladder 16 and the radially internal surface 10 of the green tire 2 to escape through the contact region between pressing bladder 16 and beads during expansion of the pressing bladder 16. In fact, the main channels 19, through said contact region, communicate with the environment external to mold 1.

The discharge channels further comprise a plurality of micro-channels 20 disposed in a reticular structure to define a plurality of cells 21. The micro-channels 20 have smaller sizes than the main channels 19. In more detail, the micro-channels 20 preferably have a width "$l_m$" (FIG. 5) included between about 0.15 mm and about 2 mm, more preferably included between about 0.25 mm and about 1 mm. The micro-channels 20 have a depth "$p_m$" (FIG. 5a) preferably included between about 0.1 mm and about 1.5 mm, more preferably between about 0.2 mm and about 0.8 mm.

The width "$l_m$" is measured in a section transverse to the longitudinal extension of the respective micro-channel 20 and along a line tangent to the radially external surface 18 of the inflated pressing bladder 16. The depth "$p_m$" is measured along a straight line orthogonal to a plane tangent to the radially external surface 18 of the inflated pressing bladder 16.

Each of the cells 21 encloses an area included between about 0.5 mm$^2$ and about 500 mm$^2$, preferably included between about 1 mm$^2$ and about 200 mm$^2$, more preferably included between about 5 mm$^2$ and about 100 mm$^2$.

The micro-channels 20 intersect the main channels 19 and therefore are in fluid communication with the same.

In the preferred embodiments the reticular structure of the micro-channels 20 is formed of contiguous polygons preferably having obtuse angles "α", such as the hexagons.

Figure 5:
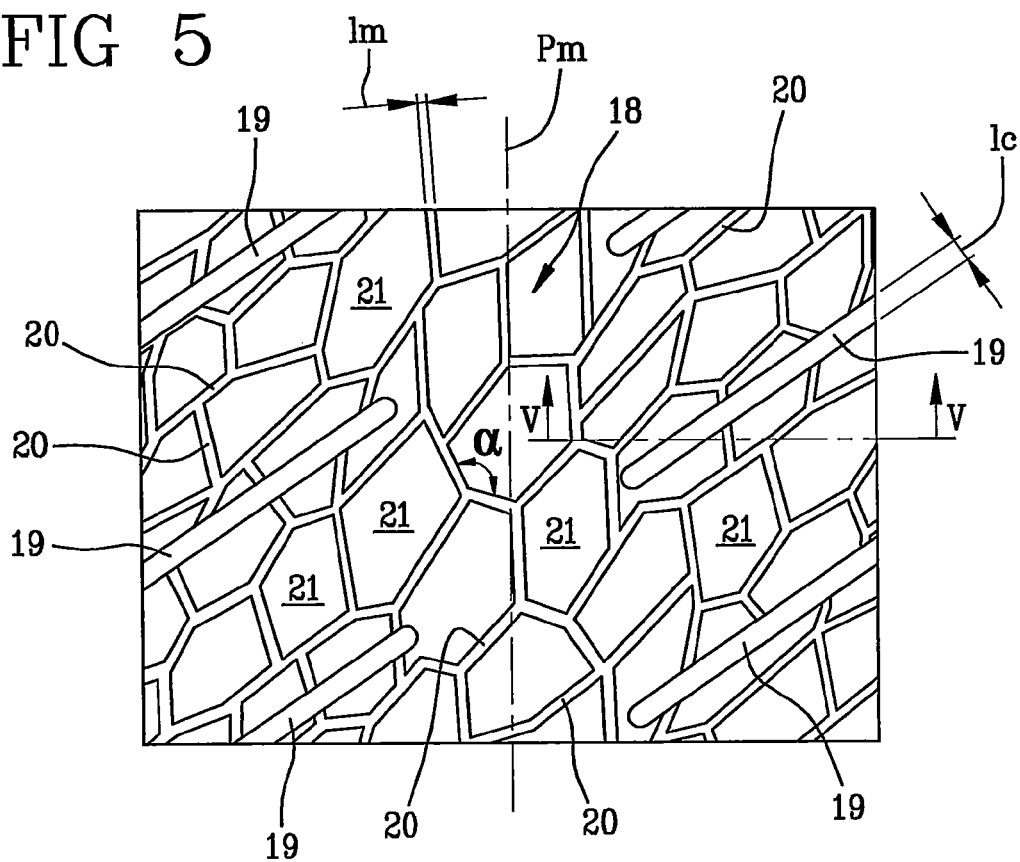
FIG. 5 is a projection on a plane of a radially external surface of the pressing bladder of the preceding figure.

In the embodiment shown in FIG. 5, the polygons are irregular and only some of angles "α" confined by the segments forming them are obtuse angles.

Figure 7:
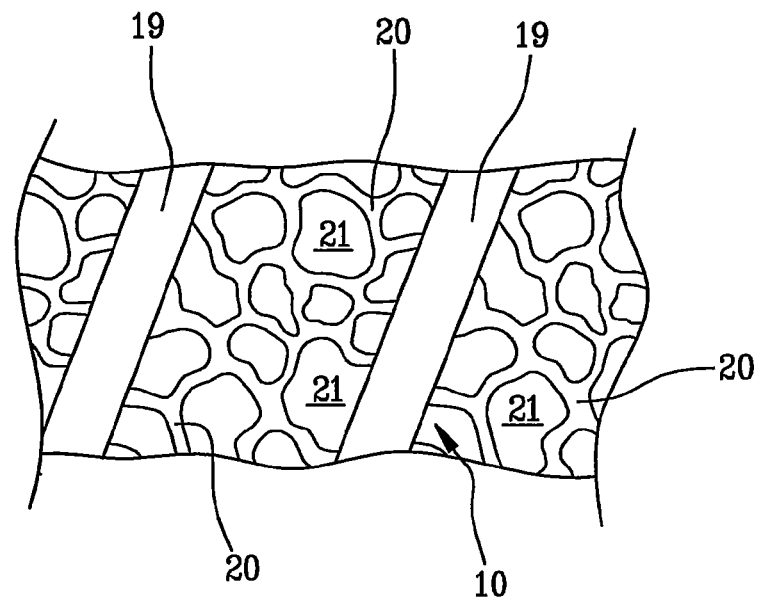
FIG. 7 is a projection on a planeof the radially external surface of an alternative embodiment of the pressing bladder.

The reticular structure of the micro-channels 20 can also be formed with irregular closed lines, as shown in FIG. 7.

During expansion of the pressing bladder 16, the latter first adheres against the inner surface 10 of the green tire 2 close to the beads and against a crown portion of the inner surface 10 close to the equatorial plane "P" of the green tire 2 (FIG. 2) and afterwards also against the portions of the inner surface 10 having a greater curvature (FIG. 3), which are situated at the boundary between the tread band 7 and the sidewalls 8 of the green tire 2. When the pressing bladder 16 fully adheres to the radially inner surface 10 of the green tire 2, i.e. when the pressing bladder 16 is fully inflated, said reticular structure in the cross section of the green tire 2, extends at least along the radially internal surface 10 thereof from about 90% of "L" (point A in FIG. 8), starting from an equatorial plane of the green tire 2, to about 20% of "H" (point B in FIG. 8), starting from a radially internal end of the green tire 2.

In an alternative embodiment, the reticular structure extends from an axially external end 6a of the belt structure 6 (point C in FIG. 8) to the region of maximum axial bulkiness of the sidewall 8 of the section of the green tire 2 (point D in FIG. 8). This region corresponds to the portion of the inner surface 10 having the greatest curvature.

In a further alternative embodiment, the reticular structure extends over the whole radially internal surface 10 of the green tire 2.

During expansion of the pressing bladder 16, the fluids interposed between the radially external surface 18 of the pressing bladder 16 and the radially internal surface 10 of the green tire 2 are compressed and guided both in the discharge channels of the pressing bladder 16 and in the circumferential grooves 11 of the green tire 2. In fact the circumferential grooves 11 are in fluid communication with the discharge channels.

More specifically, the micro-channels 20 and the circumferential grooves 11 collect the fluids distributed over the whole radially internal surface 10 of the green tire 2 and the whole radially external surface 18 of the pressing bladder 16 and convey them into the main channels 19 through which they are discharge to the outside.

When the radially external surface 18 of the pressing bladder 16 is coupled to the radially internal surface 10 of the green tire 2 the residual fluids are confined in the circumferential grooves 11 and the discharge channels, without forming dangerous stagnation pockets, and they too subsequently flow to the outside.

Figure 6:
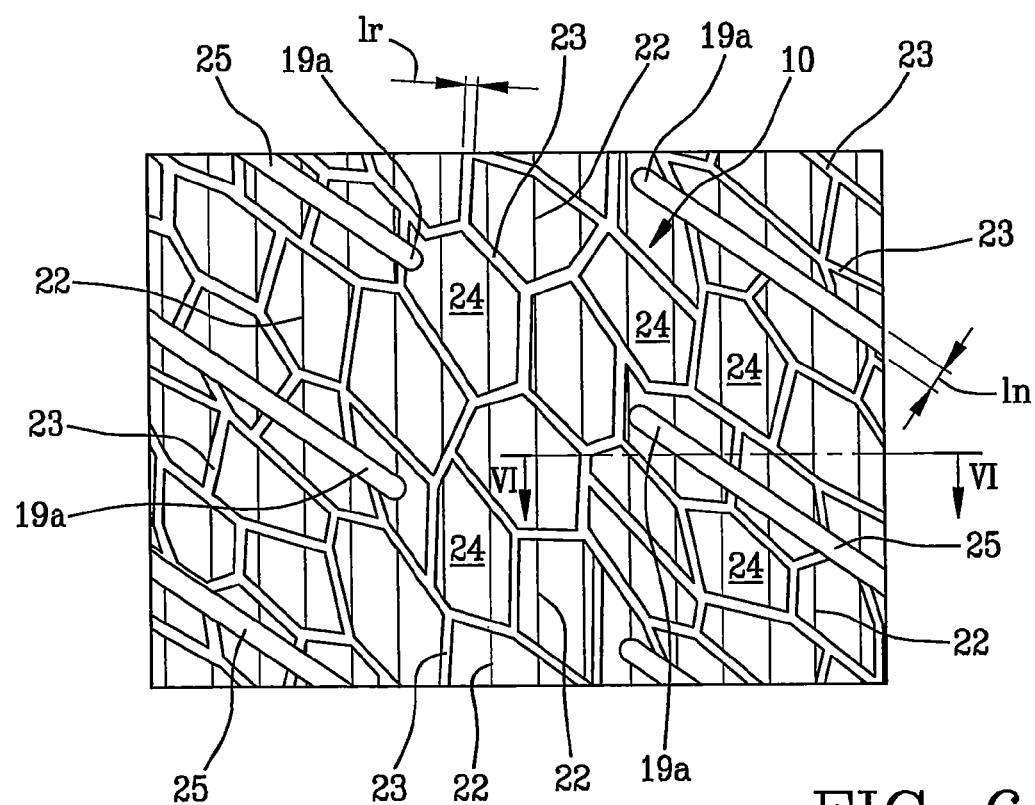
FIG. 6 is a projection on a plane of a radially internal surface of the cured and molded tire.

The pressure exerted by the pressing bladder 16 against the green tire 2 gives rise to deformation of the elastomeric material of liner 4. The coils 9a of the continuous elongated element are squashed and this causes the circumferential grooves 11 to disappear, leaving corresponding circumferential alignment lines 22 as traces (FIG. 6). These circumferential lines 22 are aligned with the rolling direction of the cured and molded tire 2'.

In addition, the elastomeric material penetrates into the discharge channels of the pressing bladder 16 taking a shape matching that of the micro-channels 20 and the main channels 19 and acquiring this stabilized shape at the end of the vulcanization and molding cycle (FIGS. 6 and 6a).

When the cycle is over, the cured and molded tire 2' is drawn out of mold 1, after opening of same.

Figure 4:
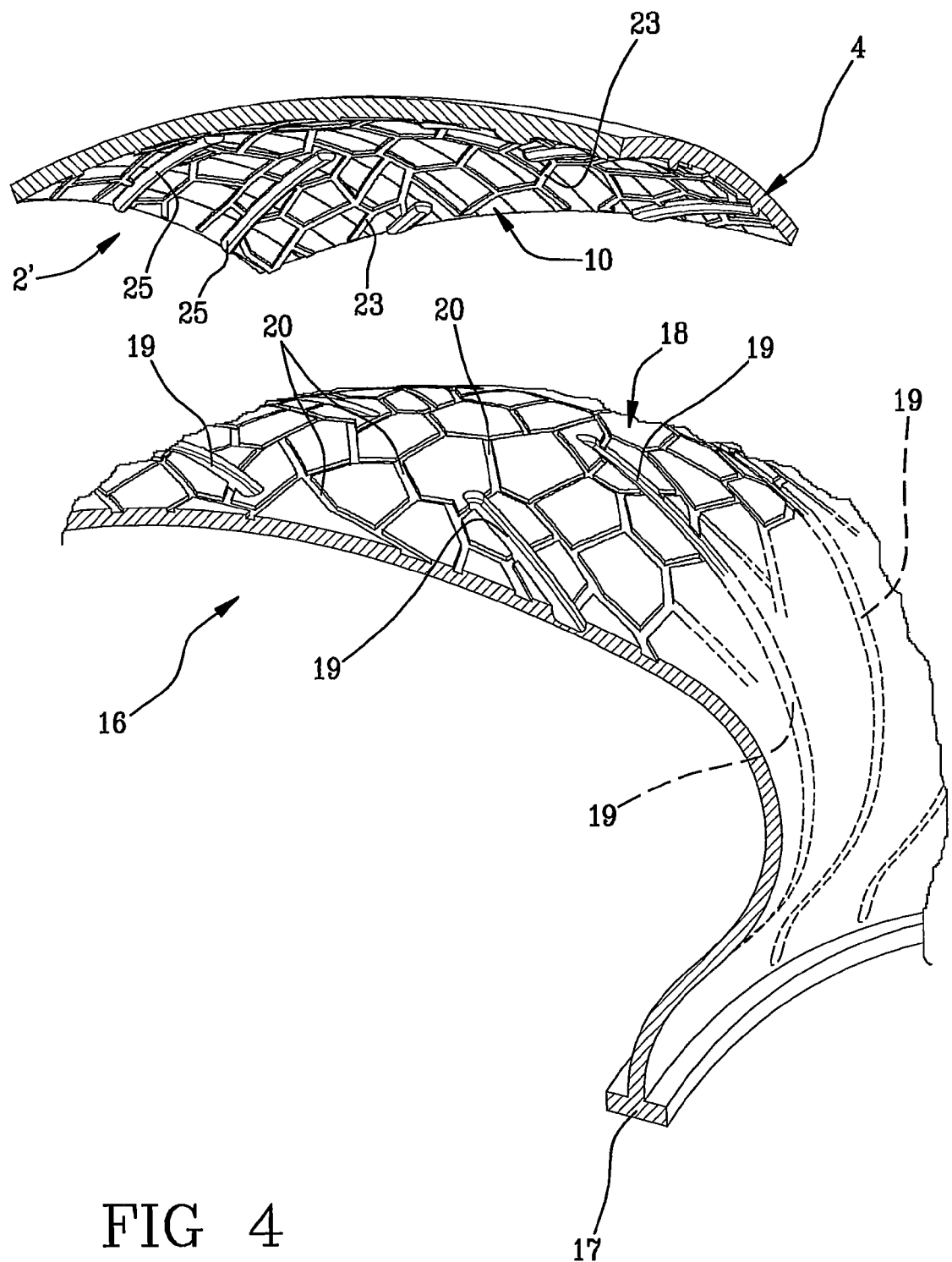
FIG. 4 is an exploded perspective view of a portion of an inflated pressing bladder belonging to the vulcanization mold seen in the preceding figures, associated with a cured and molded tire (only the radially internal portion of which is shown)

The radially internal surface 10 of the cured and molded tire 2' therefore has (FIGS. 4, 6 and 6a) a plurality of ridges 23, corresponding to the micro-channels 20 of the pressing bladder 16, disposed aria reticular structure defining a plurality of cells 24, a plurality of ribs 25 corresponding to the main channels 19 of the pressing bladder 16, and the above mentioned circumferential alignment lines 22.

Since on the pressing bladder 16 some micro-channels 20 open into one or more of the main channels 19, as a result, on the cured and molded tire 2' some of the ridges 23 are in contact with or intersect one or more ribs 25.

In the same manner as the geometric structure of the micro-channels 20, the reticular structure of ridges 23 is formed of contiguous polygons and preferably the polygons have obtuse angles. The reticular structure of ridges 23 can also be formed with irregular closed and contiguous lines corresponding to the micro-channels shown in FIG. 7.

The reticular structure on the cured and molded tire has cells 24 that are confined by ridges 23 and ribs 25 and each of which encloses an area included between about 0.5 mm$^2$ and about 500 mm$^2$, preferably included between about 1 nun$^2$ and about 200 mm$^2$, more preferably included between about 5 mm$^2$ and about 100 mm$^2$.

Ridges 23 have a width "$l_r$" (FIG. 6) included between about 0.15 mm and about 2 mm, preferably included between about 0.25 mm and about 1 mm. This width "$l_r$" is measured in a section transverse to the longitudinal extension of the respective ridge 23 and along a line tangent to the radially internal surface 10 of the cured and molded tire 2'.

Ridges 23 have a height. (FIG. 6a) included between about 0.1 mm and about 1.5 mm, preferably included between about 0.2 mm and about 0.8 mm. This height "$h_r$" is measured along a straight line orthogonal to a plane tangent to the radially internal surface 10 of the cured and molded tire 2 and it is the maximum height of the respective ridge 23.

Ribs 23 have a width "$l_n$" (FIG. 6) included between about 0.3 mm and about 4 mm, preferably included between about 0.3 mm and about 3 mm. This width "$l_n$" is measured in a section transverse to the longitudinal extension of the respective rib 25 and along a line tangent to the radially internal surface 10 of the cured and molded tire 2'.

Ribs 25 have a height "$h_n$" (FIG. 6a) included between about 0.5 mm and about 3 mm, preferably included between about 0.7 mm and about 2 mm. This height "$h_n$" is measured along a straight line orthogonal to a plane tangent to the radially internal surface 10 of the cured and molded tire 2' and it is the maximum height of the respective rib 25.

In the cross-section of the cured and molded tire 2', the reticular structure defined by ridges 23 extends along the radially internal surface 10 of same, from about 90% of "L", starting from the equatorial plane "P" of the cured and molded tire 2', to about 20% of "H", starting from a radially internal end of the cured and molded tire 2'.

In an alternative embodiment, the reticular structure extends frost an axially external end βa oil the belt structure 6 to a region of maximum axial bulkiness of the sidewall 8 of the section of the cured and molded tire 2'.

In a further alternative embodiment, the reticular structure substantially extends over the whole radially internal surface 10 of the cured and molded tire 2'.

The circumferential alignment lines 22 extend from about 90% of "L", starting from the equatorial plane "P" of the cured and molded tire 2', to about 20% of "H", starting from a radially internal end of the cured and molded tire 2'.

In an alternative embodiment, the circumferential alignment lines 22 extend from an axially external end 6a of the belt structure 6 to a region of maximum axial bulkiness of the sidewall 8 of the section of the cured and molded tire 2'.

In a further alternative embodiment, said circumferential alignment lines 22 substantially extend over the whole radially internal surface 10 of the cured and molded tire 2'.

The invention claimed is:

1. A cured and moulded tyre, comprising, on at least one portion of a radially internal surface of the tyre:
    circumferential alignment lines in a rolling direction of the tyre defined by at least one continuous elongated element of elastomeric material wound up into a plurality of coils during building of the tyre;
    a plurality of ridges disposed in a reticular structure defining a plurality of cells of irregular closed and contiguous lines; and
    a plurality of ribs, wherein each rib extends from a radial internal portion to an axial centered portion of the radially internal surface and one or more of the ridges contact or intersect one or more of the ribs;
    wherein the plurality of ridges have smaller sizes than the plurality of ribs,
    wherein, "L" represents a half-width in an axial direction of a belt structure associated at a radially external position with a carcass structure, and wherein "H" represents a section height of the cured and moulded tyre, and said circumferential alignment lines extend at least in a cross-section of the cured and moulded tyre from about 90% of "L", starting from an equatorial plane of the cured and moulded tyre to about 20% of "H", starting from a radially internal end of the cured and moulded tyre, and
    wherein the reticular structure in the section of the cured and moulded tyre extends at least along the radially internal surface thereof, from about 90% of "L" starting from the equatorial plane of the cured and moulded tyre to about 20% of "H", starting from the radially internal end of the cured and moulded tyre.

2. The cured and moulded tyre as claimed in claim 1, wherein:
    the carcass structure comprises at least one carcass ply, comprising ends which are turned up around two respective annular anchoring structures that are mutually spaced apart along the axial direction of the cured and moulded tyre.

3. The cured and moulded tyre as claimed in claim 2, wherein said circumferential alignment lines extend at least from one axially external end of a belt structure associated at a radially external position with said carcass structure, to a region of maximum axial bulkiness of a sidewall of a section of the cured and moulded tyre.

4. The cured and moulded tyre as claimed in claim 2, wherein said circumferential alignment lines substantially extend over the whole radially internal surface of the cured and moulded tyre.

5. The cured and moulded tyre as claimed in claim 1, wherein each of the cells encloses an area between about 0.5 mm² and about 500 mm.

6. The cured and moulded tyre as claimed in claim 1, wherein said ridges have a width between about 0.15 mm and about 2 mm.

7. The cured and moulded tyre as claimed in claim 1, wherein said ridges have a height between about 0.1 mm and about 1.5 mm.

8. The cured and moulded tyre as claimed in claim 1, wherein said ribs have a width between about 0.3 mm and about 4 mm.

9. The cured and moulded tyre as claimed in claim 1, wherein said ribs have a height between about 0.5 mm and about 3 mm.

10. The cured and moulded tyre as claimed in claim 1, comprising: a carcass
    structure comprising at least one carcass ply, comprising ends which are turned up around two respective annular anchoring structures that are mutually spaced apart along an axial direction of the cured and moulded tyre, wherein said reticular structure extends at least from an axially external end of a belt structure associated at a radially external position with said carcass structure, to a region of maximum axial bulkiness of a sidewall of a section of the cured and moulded tyre.

11. The cured and moulded tyre as claimed in claim 1, wherein said reticular structure substantially extends over a whole radially internal surface of the cured and moulded tyre.

12. The cured and moulded tyre as claimed in claim 1, wherein said cured and moulded tyre is of a low-section type.

13. The cured and moulded tyre as claimed in claim 1, wherein the reticular structure in the section of the cured and moulded tyre extends only along the radially internal surface thereof.

14. The cured and moulded tyre as claimed in claim 1, wherein the circumferential grooves have a width ranging from about 0.05 mm to about 2 mm.

15. The cured and moulded tyre as claimed in claim 1, wherein the circumferential grooves have a dethpth ranging from about 0.05 mm to about 1 mm.

* * * * *